(12) United States Patent
Suzuki et al.

(10) Patent No.: US 8,643,552 B2
(45) Date of Patent: Feb. 4, 2014

(54) RECEIVER WITH PLURALITY OF ANTENNA

(75) Inventors: Kazuaki Suzuki, Kyoto (JP); Keisuke Kinoshita, Osaka (JP)

(73) Assignee: Panasonic Corporation, Osaka (JP)

( * ) Notice: Subject to any disclaimer, the term of this patent is extended or adjusted under 35 U.S.C. 154(b) by 132 days.

(21) Appl. No.: 12/921,454

(22) PCT Filed: Dec. 3, 2009

(86) PCT No.: PCT/JP2009/006574
§ 371 (c)(1),
(2), (4) Date: Sep. 8, 2010

(87) PCT Pub. No.: WO2010/095200
PCT Pub. Date: Aug. 26, 2010

(65) Prior Publication Data
US 2012/0019730 A1    Jan. 26, 2012

(30) Foreign Application Priority Data

Feb. 18, 2009  (JP) ................................. 2009-034953

(51) Int. Cl.
*H01Q 1/38* (2006.01)
(52) U.S. Cl.
USPC .......................................... 343/702; 343/872
(58) Field of Classification Search
USPC ................................................. 343/702, 872
See application file for complete search history.

(56) References Cited

U.S. PATENT DOCUMENTS

| | | | |
|---|---|---|---|
| 6,218,989 B1 | 4/2001 | Schneider et al. | |
| 6,362,784 B1 | 3/2002 | Kane et al. | |
| 2004/0150569 A1* | 8/2004 | Proctor et al. | 343/702 |
| 2006/0109185 A1* | 5/2006 | Iwai et al. | 343/702 |
| 2008/0018542 A1* | 1/2008 | Yamazaki et al. | 343/702 |
| 2008/0143614 A1* | 6/2008 | Park et al. | 343/702 |
| 2008/0211723 A1* | 9/2008 | Tsubono et al. | 343/702 |
| 2008/0231538 A1* | 9/2008 | Inoue et al. | 343/872 |

FOREIGN PATENT DOCUMENTS

| | | |
|---|---|---|
| JP | 63-129310 | 8/1988 |
| JP | 09-130140 | 5/1997 |
| JP | 09-275308 | 10/1997 |
| JP | 2006-108830 A | 4/2006 |
| JP | 2006-304064 A | 11/2006 |

OTHER PUBLICATIONS

International Search Report for International Application No. PCT/JP2009/006574, Mar. 9, 2010, Panasonic Corporation.

* cited by examiner

*Primary Examiner* — Douglas W Owens
*Assistant Examiner* — Collin Dawkins
(74) *Attorney, Agent, or Firm* — RatnerPrestia

(57) ABSTRACT

The receiver diversity-receives radio wave with a plurality of antennas. The receiver includes a conductive case having a receiving section for executing diversity-receiving processing, a first through hole and a second through hole that are disposed on the surface of the same side of the case and penetrate the case from the outside to the inside, a first antenna and a second antenna for supplying a received signal to the receiving section, and a first hinge and a second hinge that are fixed to the inside of the case, pass the first through hole and the second through hole, directly or indirectly support the first antenna and the second antenna, and are movable, respectively. A partition is disposed between the first through hole and the second through hole.

13 Claims, 9 Drawing Sheets

RECEIVER WITH PLURALITY OF ANTENNA

This Application is a U.S. National Phase application of PCT International Application PCT/JP2009/006574.

TECHNICAL FIELD

The present invention relates to a receiver for receiving radio wave for transmitting information with a plurality of antennas, and especially to a receiver for receiving terrestrial television broadcasting with a plurality of antennas.

BACKGROUND ART

In a conventional receiver, a first antenna element is disposed on one surface of a case, and a second antenna element is disposed on the other surface. The first antenna element and the second antenna element are fixed to a rotation shaft and unitized. The rotation shaft penetrates the case from the front surface to the rear surface, and the first antenna element and the second antenna element support the case (for example, Patent literature 1 (FIG. 8)).

However, the technology disclosed in Patent literature 1 is related to a receiver that can use one of two different types of antenna elements: a first antenna element formed in a zigzag shape on a dielectric plate, and a second antenna element formed linearly on a dielectric plate. Therefore, this technology cannot be directly applied to a receiver simultaneously using a plurality of antennas, disadvantageously.

In the antenna disclosed in Patent literature 1, a rotation shaft of the antenna is shared, and two antenna elements are disposed on the front surface and the rear surface of the case. The rear surface is difficult to be seen by a user, and hence the first antenna element is easily disposed on it. However, the front surface of the receiver has a large screen display section for displaying television programs. The side surfaces and top surface of the receiver have operation buttons, operation dials, input/output terminals, and ventilation/exhaust holes. Therefore, it can be difficult to dispose the second antenna element on the receiver. The arrangement of the antenna elements can be difficult depending on the structure of the case.

Patent literature 1 does not disclose a structure where a plurality of antenna elements is disposed on the surface of the same side of the case, for example on the rear surface of the case.

CITATION LIST

[Patent Literature]
[Patent Literature 1] Unexamined Japanese Patent Publication No. H09-130140

SUMMARY OF THE INVENTION

A receiver of the present invention diversity-receives radio wave with a plurality of antennas. The receiver includes a conductive case, a first through hole and a second through hole, a first antenna and a second antenna, and a first hinge and a second hinge.

The conductive case has a receiving section for executing diversity-receiving processing. The first through hole and second through hole are disposed on the same surface of the case, and penetrate the case from the outside to the inside. The first antenna and the second antenna supply received signals to the receiving section. The first hinge and the second hinge are fixed to the inside of the case. The first hinge and the second hinge pass the first through hole and the second through hole and directly or indirectly support the first antenna and the second antenna, respectively. The first hinge and the second hinge support the first antenna and the second antenna movably with respect to the case. A partition for electrically interconnecting parts of the case is disposed between the first through hole and the second through hole.

Thus, by disposing the partition for electrically interconnecting the parts of the case between the first through hole and the second through hole, a conductive route of image current for power supply to the first antenna and the second antenna is secured. As a result, antenna gain is improved advantageously. By securing the conductive route simultaneously with production of the case, additional work for securing the conductive route can be reduced.

A receiver of the present invention diversity-receives radio wave with a plurality of antennas. The receiver includes a conductive case, a through hole, a first antenna and a second antenna, a first hinge and a second hinge, and a partition.

The conductive case has a receiving section for executing the diversity-receiving processing. The through hole is disposed on the surface of the same side of the case, and penetrates the case from the outside to the inside. The first antenna and the second antenna supply the received signals to the receiving section. The first hinge and the second hinge are fixed to the inside of the case. The first hinge and the second hinge pass the through hole, and directly or indirectly support the first antenna and the second antenna movably with respect to the case, respectively. The partition can move with respect to the case, can come into contact with a plurality of places near the through holes, and electrically interconnects the parts of the case. The partition forms a conductive route on the through hole during receiving.

The receiver of the present invention may have a first through hole and the second through hole that are unitized with each other, and a partition that comes into contact with a plurality of places near the through holes.

In the receiver of the present invention, the first hinge may be unitized with the second hinge.

In the receiver of the present invention, the first hinge and the second hinge may be conductive.

In the receiver of the present invention, the partition may have a linear section.

The receiver of the present invention may further have an antenna case or a stand for supporting the case, and at least one of the first hinge and the second hinge may support the antenna case or the stand.

In the receiver of the present invention, at least a part of the first antenna and the second antenna may be a part, packed section, fixed part on the surface, or movable part on the surface of the antenna case or the stand.

The receiver of the present invention may have a receiving section for receiving terrestrial television broadcasting.

The receiver of the present invention may have a receiving section for receiving a radio communication signal.

The receiver of the present invention may have a receiving section for receiving an orthogonal frequency division multiplex signal in order to attain the target.

DETAILED DESCRIPTION OF PREFERRED EMBODIMENTS (First Exemplary Embodiment)

In the present invention, a receiver for receiving terrestrial television broadcasting with a plurality of antennas is described as an example.

Figure 1A:
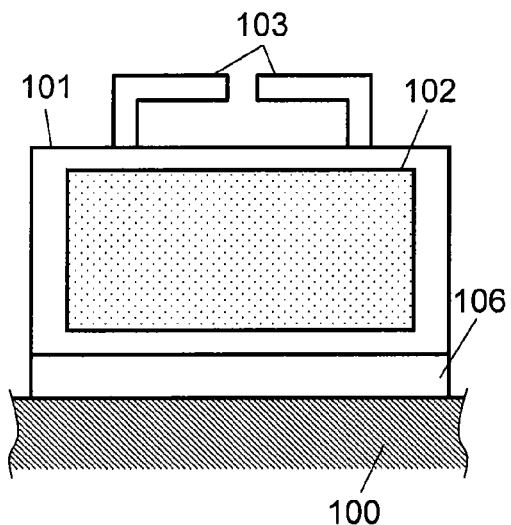
FIG. 1A is a front view of a receiver in a using state in accordance with a first exemplary embodiment of the present invention.
Figure 1C:
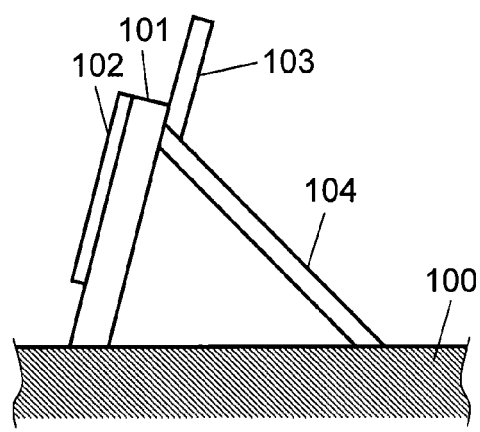
FIG. 1C is a side view of the receiver in the using state in accordance with the first exemplary embodiment of the present invention.
Figure 1B:
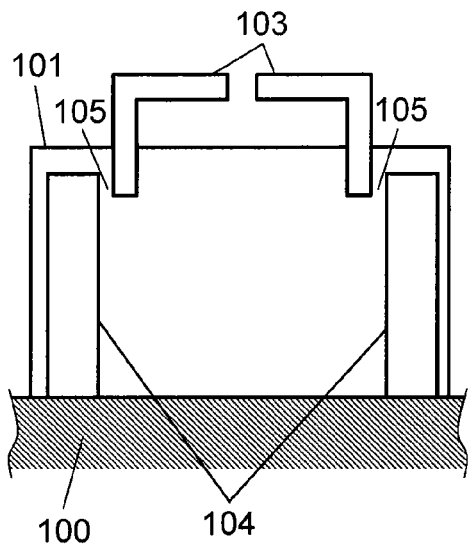
FIG. 1B is a rear view of the receiver in the using state in accordance with the first exemplary embodiment of the present invention.
Figure 1D:
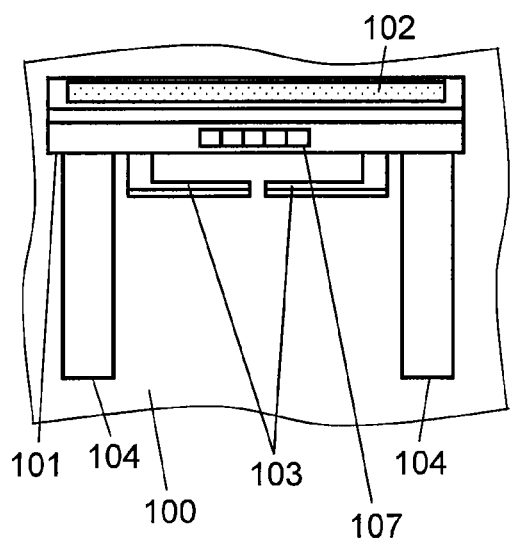
FIG. 1D is a top view of the receiver in the using state in accordance with the first exemplary embodiment of the present invention.

A receiver in accordance with a first exemplary embodiment of the present invention will be described hereinafter with reference to the accompanying drawings. FIG. 1A, FIG. 1B, FIG. 1C, and FIG. 1D are block diagrams showing the using state of the receiver in accordance with a first exemplary embodiment of the present invention. FIG. 1A is a front view of the receiver in a using state. FIG. 1B is a rear view of the receiver in the using state. FIG. 1C is a side view of the receiver in the using state. FIG. 1D is a top view of the receiver in the using state. The receiver is mounted on installing surface 100. The receiver includes the following elements:
- conductive case 101 having a built-in receiving section for receiving radio wave of terrestrial television broadcasting signals and for performing channel selection, demodulation, or decoding;
- screen display section 102 for displaying video or information;
- voice output section 106 for outputting voice;
- operation button 107 for operating information; and
- a dial (not shown).

The receiver has four antennas as the plurality of antennas for performing diversity receiving in order to stably supply radio wave of broadcasting signals to the receiving section. An antenna is mounted in right and left antenna cases 103 and right and left stands 104. Antenna cases 103 are close to case 101 near connecting points 105, and are movable so as to adjust the antenna in the direction for facilitating receiving of the broadcasting. The stands 104 are close to case 101 near connecting points 105, and are movable so as to hold case 101 on installing surface 100 at a position appropriate for receiving or listening to the broadcasting wave.

Figure 2A:
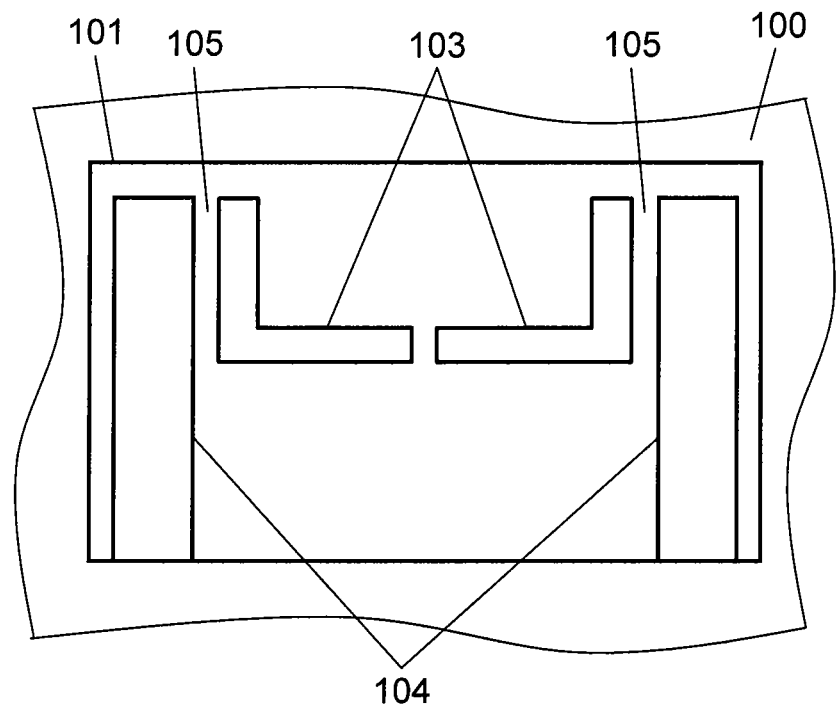
FIG. 2A is a top view of the receiver in a storing state in accordance with the first exemplary embodiment of the present invention.
Figure 2B:
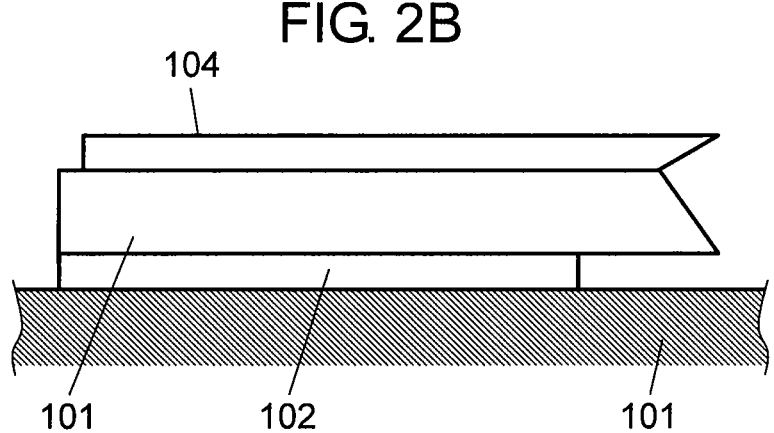
FIG. 2B is a side view of the receiver in the storing state in accordance with the first exemplary embodiment of the present invention.

FIG. 2A and FIG. 2B are block diagrams showing a storing state of the receiver in accordance with the first exemplary embodiment of the present invention. FIG. 2A is a top view of the receiver in the storing state, and FIG. 2B is a side view of the receiver in the storing state. Antenna cases 103 and stands 104 movable with respect to case 101 near connecting points 105 can be folded so as to be close to the rear surface of case 101. Thus, storing and carrying of the receiver is facilitated by making the whole receiver thinner than that in the using state.

Figure 3A:
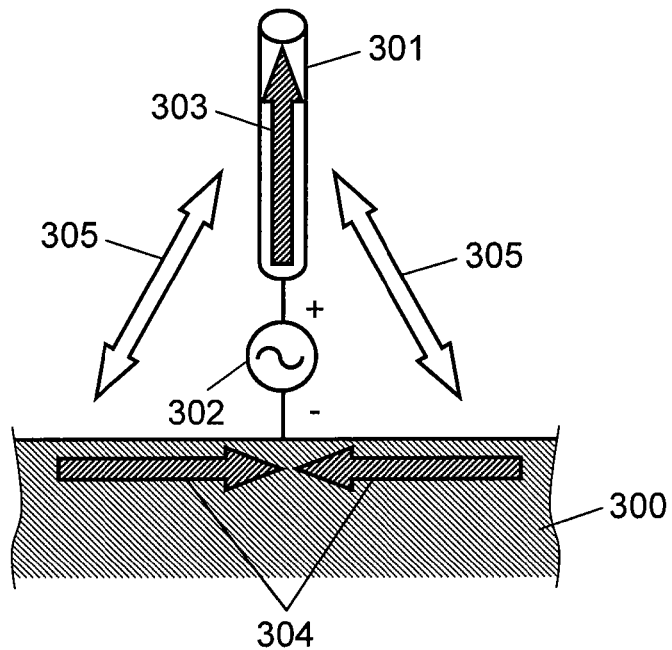
FIG. 3A is a schematic diagram illustrating a structure where the ground surface of a monopole antenna is flat.
Figure 3B:
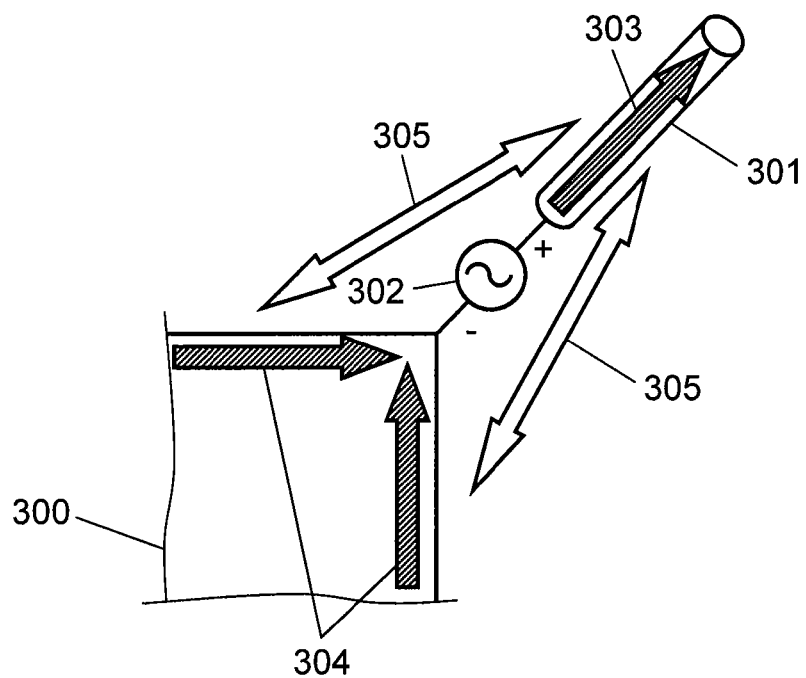
FIG. 3B is a schematic diagram illustrating a structure where the ground surface of the monopole antenna is rectangular.

Next, the antennas mounted on the receiver are described. Regarding the antennas of the present embodiment, the surface of conductive case 101 is used as the ground surface (hereinafter referred to as "GND") of the antennas. Therefore, the antennas form a structure similar to the structure of the so-called monopole antenna. FIG. 3A and FIG. 3B are diagrams illustrating the operating principle of monopole antenna 301. FIG. 3A is a schematic diagram illustrating a structure where the ground surface of monopole antenna 301 is flat. FIG. 3B is a schematic diagram illustrating a structure where the ground surface of the monopole antenna 301 is rectangular.

As shown in FIG. 3A, monopole antenna 301 is grounded to GND 300 while receiving electric power at feeding point 302. In FIG. 3A, monopole antenna 301 is driven at feeding point 302 while monopole antenna 301 is disposed on the HIGH(+) side and GND 300 is disposed on the LOW(−) side. The antenna is driven at the reverse polarity in the other half of the driving cycle. Thanks to this structure, an image antenna of monopole antenna 301 is generated on GND 300, and monopole antenna 301 is operated so that its directivity is just one half side of a dipole antenna. Therefore, it is preferable to dispose maximized GND 300 as close to feeding point 302 as possible.

The formed image antenna generates image current 304 flowing into feeding point 302 (flowing out of feeding point 302 during reverse polarity). It is preferable to maximize distance 305 so as to reduce the electromagnetic influence of the image current on antenna current 303 on monopole antenna 301. In other words, it is preferable to separate monopole antenna 301 from GND 300 as far as possible.

In the actual receiver, it is difficult to secure an infinite ground surface. Therefore, the ground surface is finite, the shape is also finite, and hence an end exists. For example, FIG. 3B shows the structure where an antenna is grounded to a corner of case 101. In this case, distance 305 is longer than that in FIG. 3A, so that a ground point is not especially required for the antenna and the antenna gain is easily increased even when the structure of case 101 is kept as it is.

Next, the antenna arrangement of the receiver is described. In FIG. 1A, FIG. 1B, FIG. 1C, and FIG. 1D, when installing surface 100 is a conductive object made of metal or the like, it is preferable that the antenna is disposed at a high position as far as possible from the ground surface in order to separate the antenna from the metal that causes reduction in antenna gain due to its electromagnetic influence. In order to prevent an obstacle around the receiving point from disturbing the arrival of the broadcasting wave, the antenna is preferably disposed at a high position. When a plurality of antennas is disposed on the upside of case 101, it is preferable to separate them from each other in order to prevent electromagnetic coupling from causing degradation between the antennas. For example, the antennas are disposed at regular intervals.

When an antenna projects from case 101, the projection disturbs its installation, causes its breakage by contact or the like, or damages its design property. Therefore, it is preferable that the antenna does not project from case 101. From the viewpoint from the design property, the antenna is disposed on the rear side of case 101 that is not seen by a user. However, the antenna for terrestrial television broadcasting using an ultrahigh frequency (UHF) band is preferably monopole antenna 301 of 10 cm or longer, and hence the shape still disturbs its installation or causes its breakage by contact.

Therefore, the antennas are mounted on stands 104 for supporting case 101. Stands 104 are disposed not horizontally but diagonally to installing surface 100, so that the horizontal length of them is short and disturbance in installation reduces. The antennas are also reinforced by stands 104, so that the antennas do not require so great strength. Some structure can suppress the breakage by the contact.

A handle usable in carrying case 101 is attached to an upper part of case 101, and is used as antenna cases 103 on which the antennas are mounted. In this case, when monopole antenna 301 of 10 cm or longer is mounted to the handle, the handle becomes high to damage the design property. Therefore, an L-shaped antenna is used as a top antenna, which is a first antenna, and is mounted to the antenna case. Thus, the handle is lowered. In addition, when the handle is disposed on the upside or backside of case 101, not only the disturbance in installation and breakage by the contact are prevented, but also the antenna gain can be improved. The antenna case has a design function as a handle. Connecting points 105 between the antennas and case 101 are disposed on the rear surface, thereby securing the design property.

When the top antenna has an L shape, however, right and left L-shaped antennas are required to separate from each other by a distance long enough to prevent the influence of electromagnetic coupling or the like. In order to separate them from each other, antenna cases 103 and stands 104 for mounting the top antenna and a stand antenna as the second antenna on the right and left sides are disposed at ends of case 101. Thus, the top antenna and the stand antenna are disposed as in FIG. 3B, and the antenna gain is apt to increase. When both antennas are disposed at respective ends of case 101, the structure of the proximity of connecting points 105 to case 101 is more complicated than that when only one of the antennas is used.

Thus, the receiver of the present exemplary embodiment further has antenna case 103 or stand 104 for supporting case 101. As described using FIG. 4A and FIG. 4B, at least one of first hinge 451 and second hinge 452 may support antenna case 103 or stand 104.

Figure 4A:
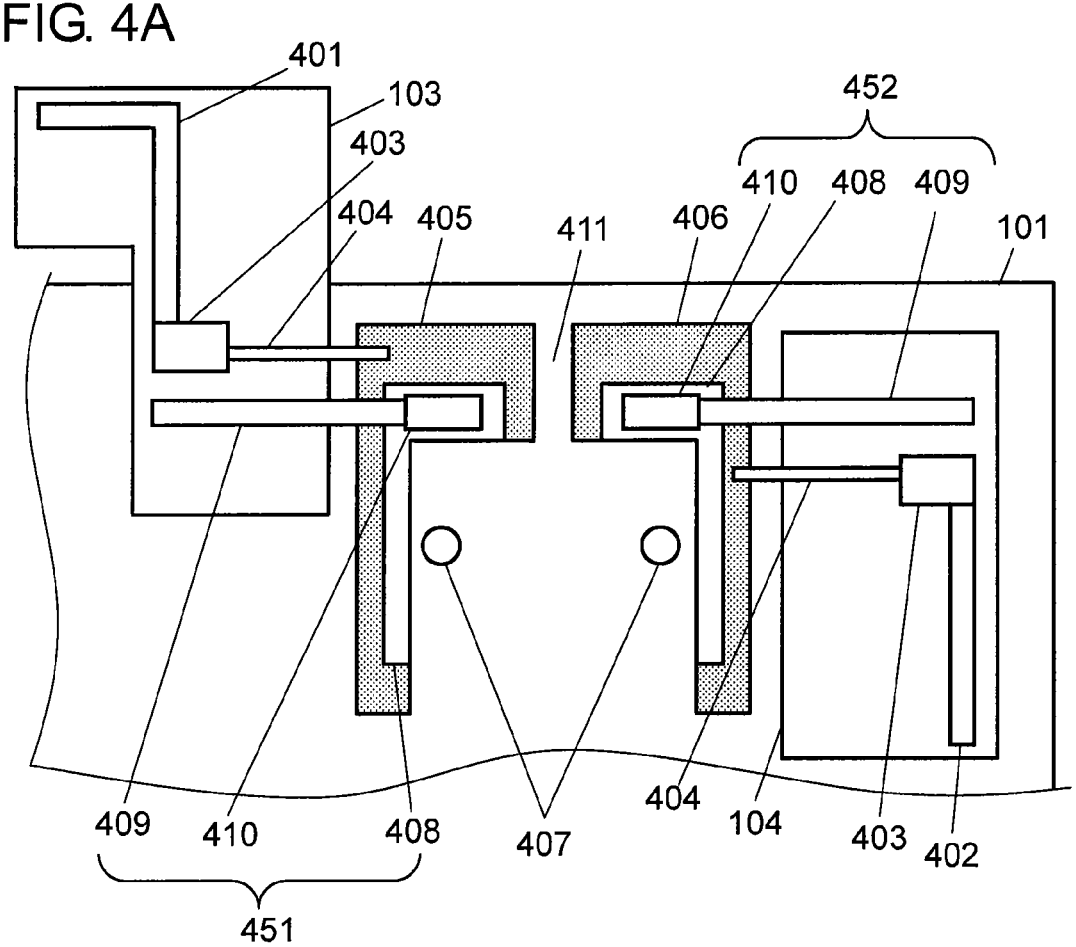
FIG. 4A is a schematic diagram of a surface of a case seen from the outside of the case near a connecting point in accordance with the first exemplary embodiment of the present invention.
Figure 4B:
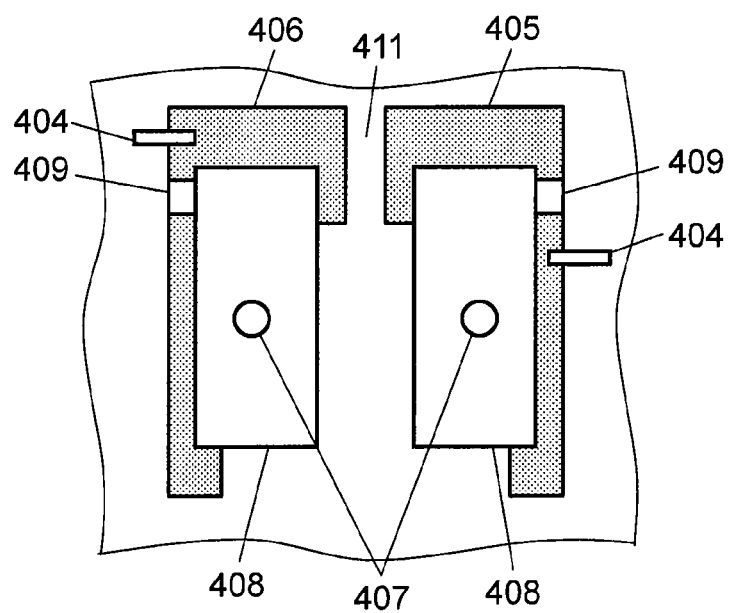
FIG. 4B is a schematic diagram of the surface of the case seen from the inside of the case near the connecting point in accordance with the first exemplary embodiment of the present invention.

Next, FIG. 4A and FIG. 4B show an example of the structure of the proximity of connecting points 105 of top antenna 401 and stand antenna 402 to case 101. FIG. 4A is a schematic diagram of a surface of case 101 seen from the outside of case 101 near the connecting point. FIG. 4B is a schematic diagram of the surface of case 101 seen from the inside of case 101 near the connecting point. Top antenna 401 is mounted in antenna case 103, and stand antenna 402 is mounted in stand 104. Each of top antenna 401 and stand antenna 402 is connected to feeding section 403 that is formed of a matching section for matching impedance and a control section for controlling a received signal. Feeding section 403 performs feeding and control from case 101 with feeding line 404. The surface of case 101 has first through hole 405 that makes feeding line 404 and the hinge for movably supporting antenna cases 103 penetrate case 101, and second through hole 406 that makes feeding line 404 and the hinge for movably supporting stands 104 penetrate case 101. Partition 411 for electrically interconnecting the parts of case 101 existing on the upside and downside of both through holes is disposed between first through hole 405 and second through hole 406. Partition 411 has a linear part. The reason for this is described later.

Figure 5A:
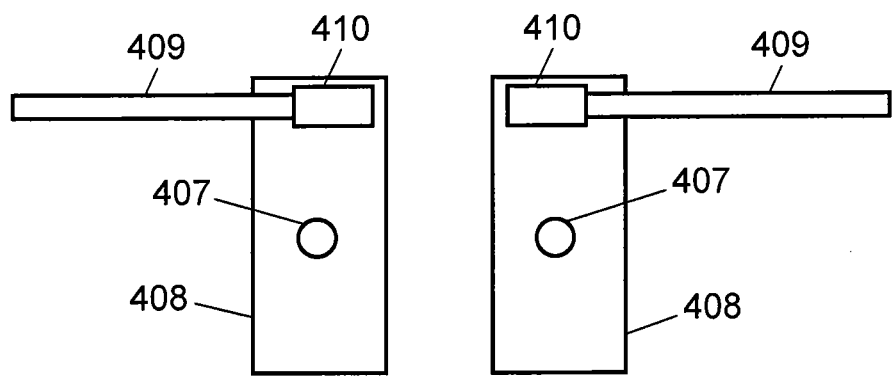
FIG. 5A is a top view for illustrating a structure of a hinge in accordance with the first exemplary embodiment of the present invention.
Figure 5B:
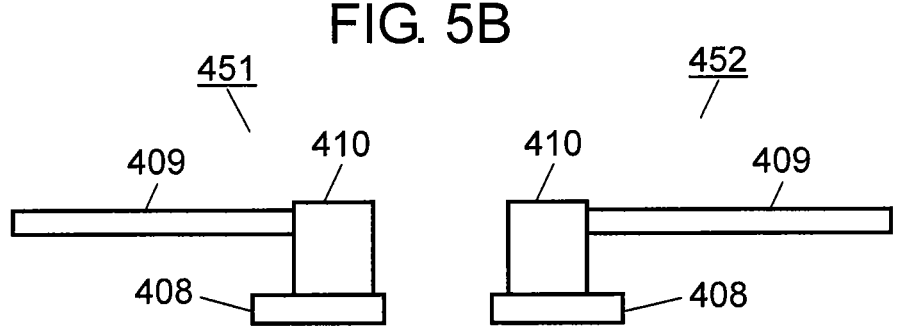
FIG. 5B is a side view for illustrating the structure of the hinge in accordance with the first exemplary embodiment of the present invention.

FIG. 5A and FIG. 5B are views showing a structure example of the hinges in accordance with the first exemplary embodiment of the present invention. FIG. 5A is a top view of the hinges seen from the upside, and FIG. 5B is a side view of the hinges seen from a side. The hinges are first hinge 451 and second hinge 452. Each of first hinge 451 and second hinge 452 is formed of fixed plate 408, support shaft 409, and movable section 410. Fixed plate 408 is screwed to the inside of case 101 using screw 407. Support shaft 409 is fixed to antenna case 103 or stand 104 and supported outside case 101. Movable section 410 is not lower than the thickness of the surface of case 101, is fixed to fixed plate 408, and supports support shaft 409 movably. Therefore, top antenna 401 and stand antenna 402 are also indirectly supported by the hinges, and are movable with respect to case 101. First hinge 451 and second hinge 452 are conductive, connect support shafts 409 to feeding sections 403, directly support top antenna 401 and stand antenna 402, and are also used as GND 300.

Since top antenna 401 and stand antenna 402 are disposed near the ends of case 101, both hinges for supporting them are made close to each other near the end of case 101. Not only in order to achieve the closeness but also in order to improve the easiness of processing of case 101, reduce the material cost, and improve the easiness of attaching work, a structure where first through hole 405 is connected to second through hole 406 and partition 411 is eliminated to share a through hole is also advantageous. However, it turns out that this structure has a defect.

Figure 6A:
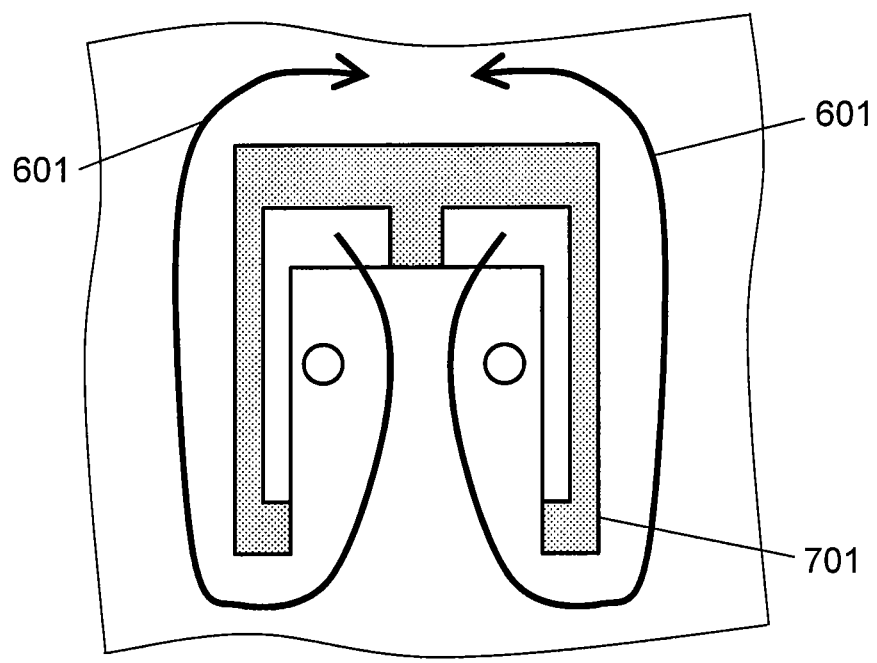
FIG. 6A is a schematic diagram for illustrating a structure when a through hole is shared in accordance with the first exemplary embodiment of the present invention.

This defect is described in detail. FIG. 6A is a schematic diagram for illustrating a structure where through hole 701 is shared. As shown in FIG. 6A, when power is supplied to top antenna 401 and stand antenna 402, image current flows into case 101 through the hinges serving as GND 300 thereof. If a structure where image current more freely flows into case 101 as GND 300 is not formed, an accurate image antenna cannot be formed. As a result, the electromagnetic field generated by the antenna becomes turbulent, and the gain of the antenna can reduce.

In the structure shown in FIG. 6A, the image current flowing from fixed plate 408 of the hinge into case 101 passes route 601 in order to arrive at the upside of common through hole 701, for example. When route 601 of the image current is considered as an image antenna, occurring radiation of the electromagnetic field affects the electromagnetic field generated by top antenna 401 and stand antenna 402. The radiation efficiency of the antenna is calculated as follows using wavelength λ, antenna length (s), and proportional coefficient (k) when antenna length (s) is sufficiently shorter than wavelength λ:

$$\text{Radiation efficiency of antenna} = 1/(1+k(\lambda/s)) \quad \text{Equation (1).}$$

According to Equation (1), the radiation efficiency decreases with decrease in antenna length (s) when antenna length (s) is sufficiently shorter than wavelength λ.

Figure 6B:
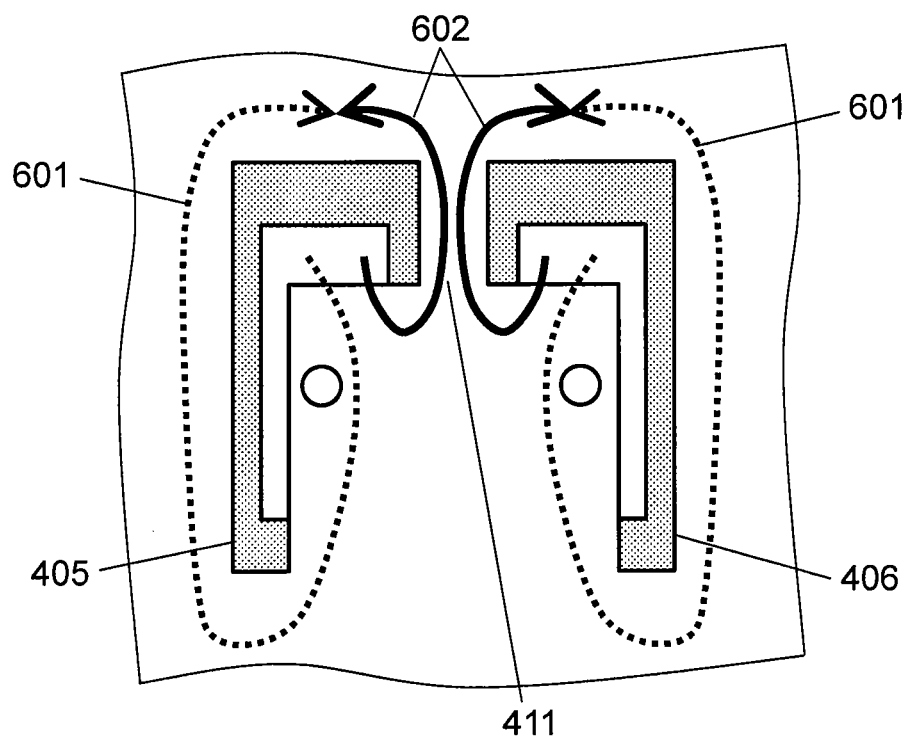
FIG. 6B is a schematic diagram for illustrating a structure having a partition while the through hole in accordance with the first exemplary embodiment of the present invention is divided into a first through hole and a second through hole.

Based on such analysis, the inventors design a structure near the connecting point as shown in FIG. 6B. FIG. 6B is a schematic diagram for illustrating a structure having partition 411 while through hole 701 in accordance with the first exemplary embodiment of the present invention is divided into first through hole 405 and second through hole 406. As shown in FIG. 6B, in order to suppress extra radiation of the electromagnetic field that affects top antenna 401 and stand antenna 402, partition 411 is made linear so as to be the shortest. When the linear shape is difficult to be formed due to constraint by design or mechanism, however, a shape as close to the linear shape as possible is formed. As a result, since there is partition 411, image current flows in route 602 shorter than route 601 in order to arrive at the upside of first through hole 405 and second through hole 406.

For the above-mentioned reason, the image current less affects the electromagnetic field generated by top antenna 401 and stand antenna 402 in the structure of FIG. 6B than in the structure of FIG. 6A. Here, the route where the image current flows is long in the structure of FIG. 6A, and is short in the structure of FIG. 6B. As a result, the gain of top antenna 401 and stand antenna 402 increases. The antenna gain is higher in the structure of FIG. 6B having partition 411 than in the structure of FIG. 6A having no partition 411.

The receiver of the present embodiment includes the following elements:
  conductive case 101;
  first through hole 405 and second through hole 406;
  a first antenna and a second antenna; and
  first hinge 451 and second hinge 452.

Conductive case 101 has a receiving section for executing the diversity-receiving processing. First through hole 405 and second through hole 406 are disposed on the surface of the same side of case 101, and penetrate case 101 from the outside to the inside. Top antenna 401 as the first antenna and stand antenna 402 as the second antenna supply the received signals to the receiving section. First hinge 451 and second hinge 452 are fixed to the inside of case 101. First hinge 451 and second hinge 452 pass first through hole 405 and second through hole 406, directly or indirectly support the first antenna and the second antenna, and are movable with respect to case 101, respectively. Partition 411 electrically interconnecting parts of case 101 is disposed between first through hole 405 and second through hole 406.

Thus, by disposing partition 411 for electrically interconnecting the parts of case 101 between first through hole 405 and second through hole 406, a conductive route of image current for power supply to the first antenna and the second antenna is secured. As a result, the antenna gain is improved advantageously.

(Second Exemplary Embodiment)

Figure 7A:
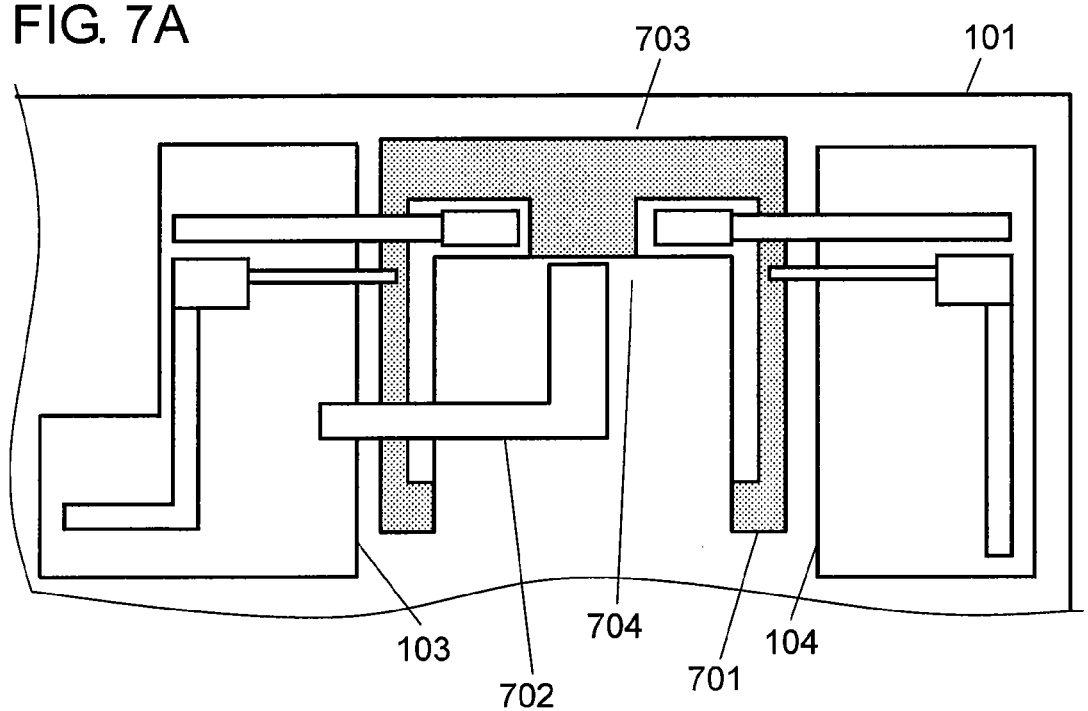
FIG. 7A is a schematic diagram of a surface of a case seen from the outside of the case near a connecting point in a storing state in accordance with a second exemplary embodiment of the present invention.
Figure 7B:
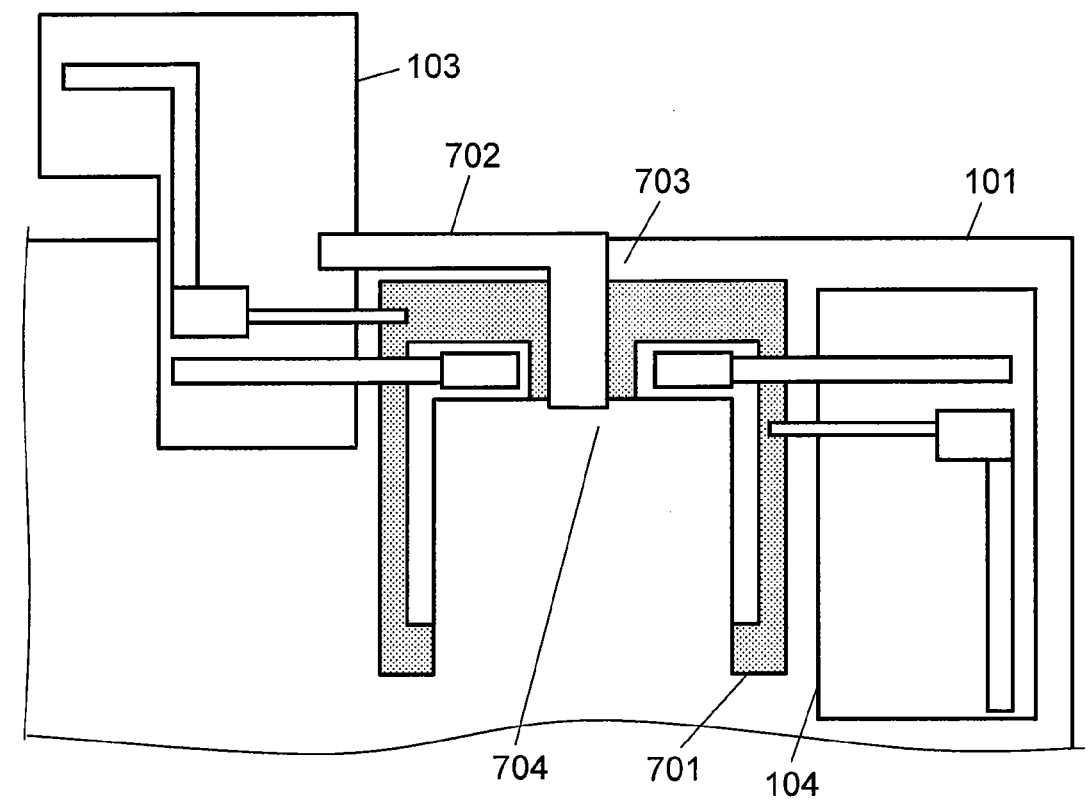
FIG. 7B is a schematic diagram of the surface of the case seen from the outside of the case near the connecting point in a using state in accordance with the second exemplary embodiment of the present invention.

A receiver in accordance with a second exemplary embodiment of the present invention will be described hereinafter with reference to the accompanying drawings. The receiver of the second exemplary embodiment has a structure that is partially common with that of the first exemplary embodiment, so that only the different structure is described. FIG. 7A and FIG. 7B are block diagrams showing the proximity of connecting point 105 of the receiver of the second exemplary embodiment of the present invention. FIG. 7A is a schematic diagram of a surface of case 101 seen from the outside of case 101 near the connecting point in a storing state. FIG. 7B is a schematic diagram of the surface of case 101 seen from the outside of case 101 near the connecting point in a using state. Through hole 701 is a common through hole formed by connecting first through hole 405 to second through hole 406 by eliminating partition 411 of the first exemplary embodiment. Therefore, the processing property of case 101 is improved, the material cost is reduced, and the easiness of hinge attaching work is improved.

In this structure, however, the route of the image current is restricted, and the antenna gain can reduce. Therefore, movable partition 702 is introduced. Movable partition 702 is connected so as to cooperate with moving of antenna case 103 and stand 104 or operation of a receiving section. Therefore, movable partition 702 comes into contact with upside 703 and downside 704 of through hole 701 in the using state. As a result, movable partition 702 bridges upside 703 and downside 704 of through hole 701 so as to pass the image current. In a storing state, movable partition 702 moves to an undisturbed preparing position in preparation for the using state. In other words, movable partition 702 is movable with respect to case 101.

Figure 8A:
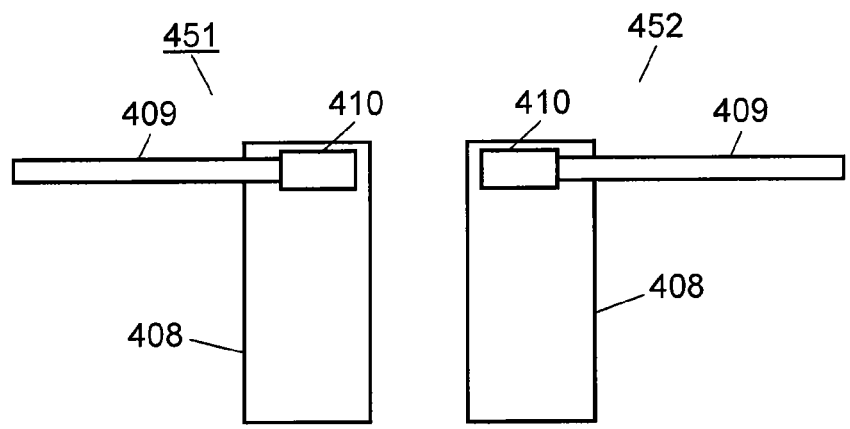
FIG. 8A is a schematic diagram for illustrating a structure employing separate hinges in accordance with the second exemplary embodiment of the present invention.
Figure 8B:
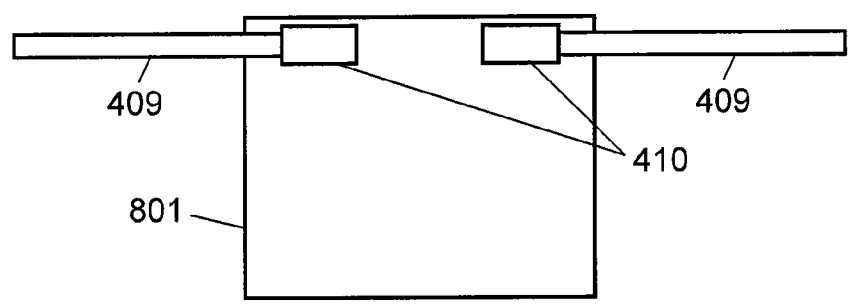
FIG. 8B is a schematic diagram for illustrating a structure where a fixed plate is shared in accordance with the second exemplary embodiment of the present invention.
Figure 8C:
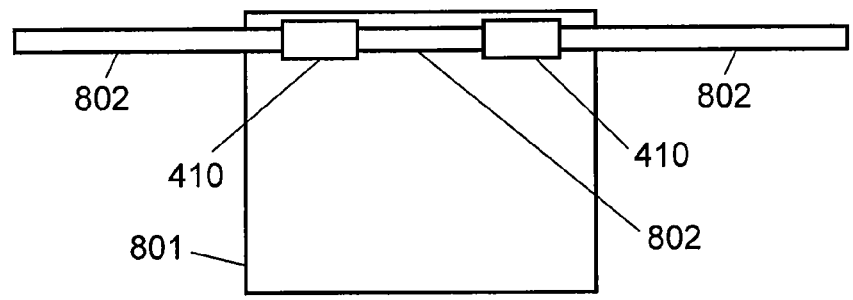
FIG. 8C is a schematic diagram for illustrating a structure where a support shaft is shared in accordance with the second exemplary embodiment of the present invention.
Figure 8D:
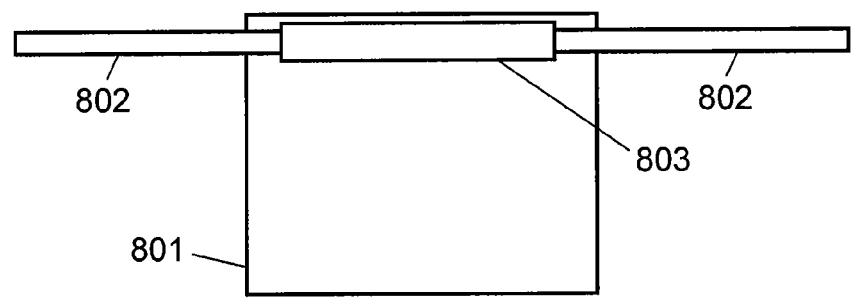
FIG. 8D is a schematic diagram for illustrating a structure where a movable section is shared in accordance with the second exemplary embodiment of the present invention.

Since through hole 701 is shared by the connection, not only the processing property of case 101 is improved and the easiness of attaching work is improved, but also the flexibility of the hinge structure is improved. FIG. 8A, FIG. 8B, FIG. 8C, and FIG. 8D are diagrams showing examples of the hinge structure in accordance with the second exemplary embodiment of the present invention. FIG. 8A is a schematic diagram for illustrating a structure employing separate hinges. FIG. 8B is a schematic diagram for illustrating a structure where fixed plates 408 of the hinges of FIG. 8A are unitized. FIG. 8C is a schematic diagram for illustrating a structure where support shafts 409 of FIG. 8A are unitized. FIG. 8D is a schematic diagram for illustrating a structure where movable sections 410 of FIG. 8A are unitized. Thus, first hinge 451 and second hinge 452 may be unitized. In other words, by sharing fixed plate 801, support shaft 802, and movable section 803, not only the manufacturing efficiency is improved and the attaching work is reduced, but also GND 300 of top antenna 401 and stand antenna 402 is strengthened and moving and cooperation with antenna case 103 and stand 104 can be achieved.

The receiver of the present embodiment includes the following elements:
  conductive case 101;
  through hole 701;

a first antenna and a second antenna;
a first hinge and a second hinge; and
movable partition 702.

Conductive case 101 has a receiving section for executing the diversity-receiving processing. Through hole 701 is disposed on the surface of the same side of case 101, and penetrates case 101 from the outside to the inside. The first antenna and the second antenna supply the received signals to the receiving section. The first hinge and the second hinge are independently fixed to the inside of case 101. The first hinge and the second hinge pass through hole 701 and directly or indirectly support the first antenna and the second antenna, respectively. The first hinge and the second hinge are movable with respect to case 101. Movable partition 702 is movable with respect to case 101 and can come into contact with a plurality of points near through hole 701. A conductive route is formed of movable partition 702 on through hole 701 during receiving.

Thus, by disposing movable partition 702 between parts of case 101 near through hole 701, a conductive route of the image current for power supply to the first antenna and the second antenna is secured. As a result, antenna gain is improved advantageously.

The present invention is not limited to the contents described in each exemplary embodiment. Each exemplary embodiment of the present invention is not limited to the receiver of the terrestrial television broadcasting, and may be applied to the receiver of any radio wave. The receiver may have a receiving section for receiving various radio communication signals. The receiver may be used for receiving communication signals of the terrestrial television broadcasting, data broadcasting, or radio wave, or for measuring the radio wave. The radio wave may have any form. For example, the radio wave may be orthogonal frequency division multiplex (OFDM) signals or code division multiplex (CDM) signals. In other words, the receiver may have a receiving section for receiving the orthogonal frequency division multiplex signals.

Figure 9A:
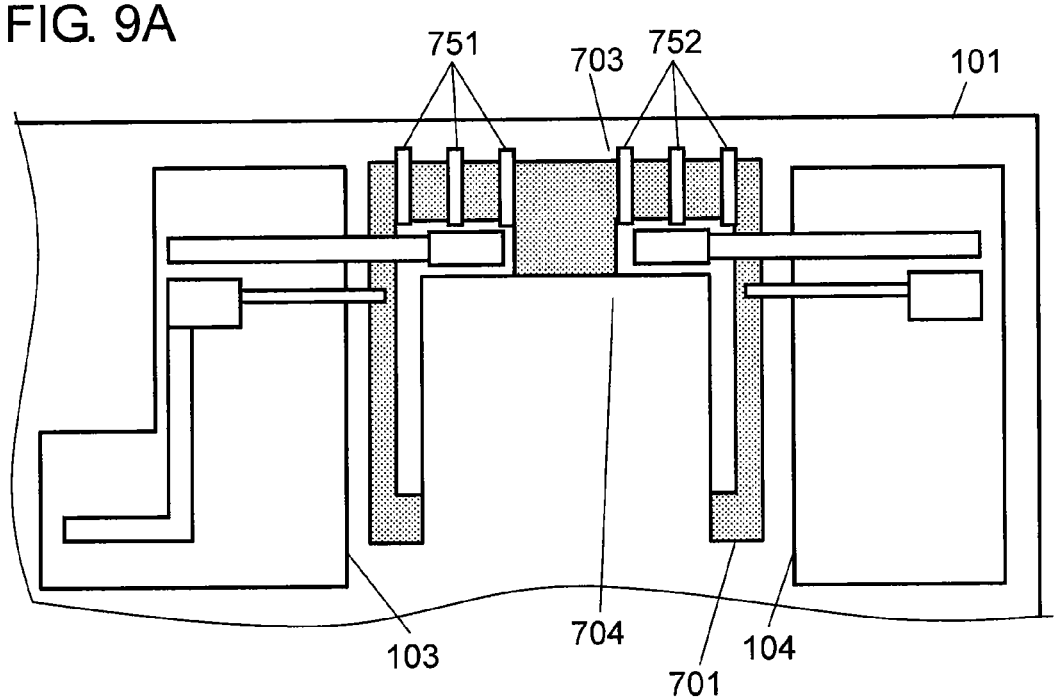
FIG. 9A is a schematic diagram for illustrating a structure where a plurality of partitions is disposed between the hinge and the case in accordance with the second exemplary embodiment of the present invention.
Figure 9B:
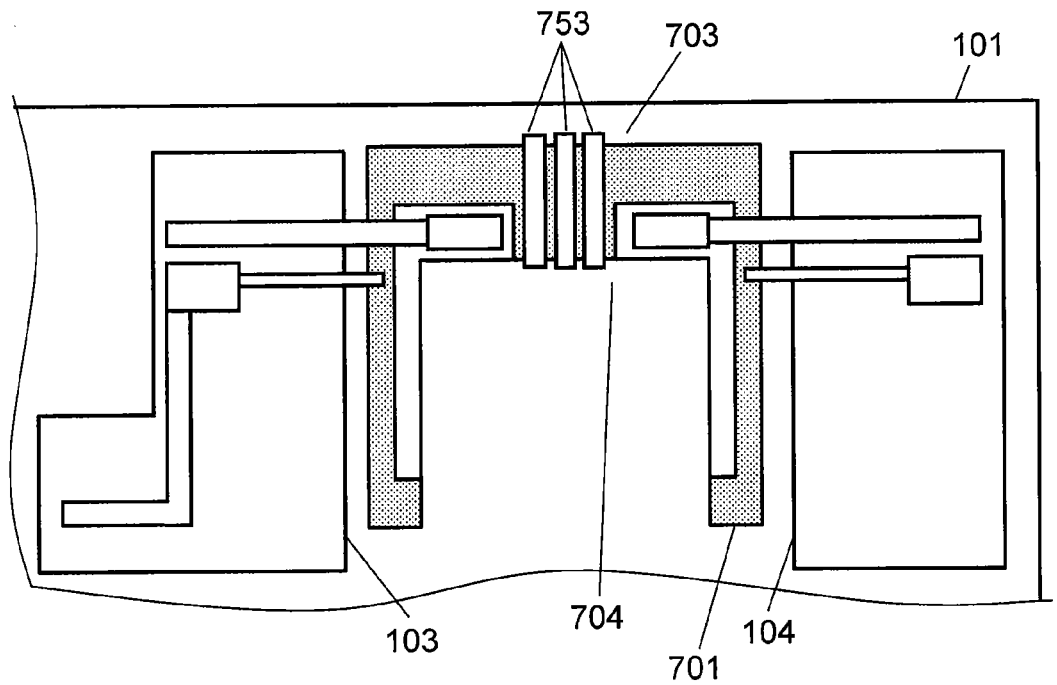
FIG. 9B is a schematic diagram for illustrating a structure where a plurality of partitions is disposed between parts of the case in accordance with the second exemplary embodiment of the present invention.

All components may have any structure instead of structures shown by the diagrams or descriptions. For example, the receiver has two right and left antenna cases 103 and two right and left stands 104, but may have one antenna case 103 and one stand 104 or may have three or more antenna cases 103 and three or more stands 104. They may be partially unitized. They may have any shape such as an H shape, X shape, or recessed shape, instead of the L shape or straight shape. Antenna case 103 may have any structure instead of a handle, or may function only as antenna case 103, for example. The number of screen display sections 102 may be any number, and screen display sections 102 may be disposed at any positions and may have any shape like a round light emitting diode (LED) other than a rectangle. Case 101 may have any shape, or may have a polyhedral shape, a curved shape, or a combination of them, for example. Case 101 may separately have a battery and a power supply. Connecting points 105 may be disposed on a side surface, the top surface, or the front surface instead of on the rear surface, and may be disposed on different surfaces. Through hole 701 and partition 411 may be disposed at any positions, or may have any shapes. The number of through holes 701 and the number of partitions 411 may be any number. For example, through holes 701 may be formed separately for a hinge and for feeding line 404, and first through hole 405 and second through hole 406 may be unitized. The partition may be disposed between a hinge and case 101, and a plurality of partitions may be formed. FIG. 9A shows an example where a plurality of partitions 751 and 752 is disposed between the hinge and case 101. In other words, first through hole 405 and second through hole 406 are unit-ized, and have partitions 751 and 752 coming into contact with a plurality of points near through hole 701. As shown in FIG. 9B, partitions 753 may be disposed so as to come into contact with a plurality of points between parts of case 101. Thus, a conductive route can be formed by electrically interconnecting upside 703 and downside 704 of through hole 701 of case 101. As a result, image current can pass the conductive route. As a result, antenna gain is improved advantageously.

The deformation example of the hinge shown in the second exemplary embodiment may be applied to the first exemplary embodiment. The hinge may have any combination for sharing fixed plate 801, support shaft 802, and movable section 803. For example, support shaft 802 and movable section 803 may be shared. The hinge may have any shape. For example, fixed plate 801 or support shaft 802 may be eliminated, the hinge may be screwed with the outside of case 101, or movable section 803 may not be higher than the thickness of case 101. The hinge does not need to be conductive, does not need to be connected to feeding section 403, and may be unitized with any of case 101, antenna case 103, and stand 104. Voice output section 106 and operation button 107 may be mounted on any positions, or may be eliminated. For example, the speaker may be installed separately from the receiver, and operation button 107 may be mounted on a remote control unit or on a touch panel on screen display section 102.

The number of antennas may be any number, and the antennas not only may be monopole antennas but also may have any shapes. For example, they may be dipole antennas, whip antennas, rod antennas, slot antennas, loop antennas, patch antennas, top load antennas, meander antennas, helical antennas, L antennas, or inverted F antennas. A matching section and a control section may be eliminated, and any other processing may be added. For example, an amplifying section for amplifying a signal may be added.

The antenna may be disposed at any position instead of in the proximity of antenna case 103 or stand 104. For example, the antenna may be disposed in a rear, top, or side space of case 101.

Top antenna 401 and stand antenna 402 may have any structure, instead of being packed in antenna case 103 or stand 104. At least a part of them may be packed, they may be partially mounted, they may be attached to the surface, or they may be movably attached to the surface. In other words, at least a part of the first antenna and the second antenna may be a part, packed section, fixed part on the surface, or movable part on the surface of antenna case 103 or stand 104.

GND 300 of the antenna may use any place or any part, instead of using a part of case 101 or the hinge. For example, GND 300 may use a part of antenna case 103 or stand 104.

The position of each component in the storing state is not limited to the above-mentioned position, but may be any position. The operation of each movable component is not limited to the above-mentioned operation, but may be any operation. For example, the hinge, antenna case 103, or stand 104 may be folded by rotation in one direction, movement in many directions, multi-joint movement having a joint, slide-like movement, and combination of them.

The receiving section may be a receiving circuit. The receiving circuit is partially formed of an integrated circuit. This integrated circuit may be a large scale integration (LSI), a central processing unit (CPU), a digital signal processor (DSP), a graphics processing unit (GPU), a micro processing unit (MPU), a field programmable gate array (FPGA), or a re-configurable processor. The integrated circuit may be formed or integrated by technology other than semiconductor technology. For example, the integrated circuit may be a circuit or integrated circuit based on light signal processing, quantum engineering, or biotechnology. A part of the processing performed by the integrated circuit may be achieved by a program. This program may be provided as a content using a recording medium or communications.

Industrial Applicability

The receiver of the present invention is useful as a receiver for receiving radio wave transmitting information with a plurality of antennas. Especially, this receiver is appropriate for a receiver having antennas for diversity-receiving the terrestrial television broadcasting.

REFERENCE MARKS IN THE DRAWINGS 100 installing surface
101 case
102 screen display section
103 antenna case
104 stand
105 connecting point
106 voice output section
107 operation button
300 GND
301 monopole antenna
302 feeding point
401 top antenna (first antenna)
402 stand antenna (second antenna)
403 feeding section
404 feeding line
405 first through hole
406 second through hole
407 screw
408, 801 fixed plate
409, 802 support shaft
410, 803 movable section
411 partition
451 first hinge
452 second hinge
701 through hole
702 movable partition
751, 752, 753 partition

The invention claimed is:

1. A receiver for diversity-receiving a radio wave, the receiver comprising:
a conductive case having a receiving section for executing diversity-receiving processing;
a first through hole and a second through hole each disposed on an identical side of the conductive case and which penetrate the conductive case from an outside surface to an inside surface, the first through hole spaced apart from the second through hole by a partition, the partition electrically interconnecting parts of the conductive case existing on an upside and a downside of both the first through hole and the second through hole;
a first antenna and a second antenna for receiving the radio wave and for supplying a received signal to the receiving section; and
a first hinge and a second hinge each fixed to the inside of the case, which pass the first through hole and the second through hole to support the first antenna and the second antenna, respectively, and which are separately movable with respect to the conductive case.

2. The receiver of claim 1 further comprising the partition that comes into contact with a plurality of points near the first through hole and the second through hole, wherein the first through hole and the second through hole are unitized.

3. The receiver of claim 1, wherein
the first hinge and the second hinge are unitized.

4. The receiver of claim 1, wherein
the first hinge and the second hinge are conductive.

5. The receiver of claim 1, wherein
the partition has a linear section.

6. The receiver of claim 1 further comprising one of an antenna case and a stand for supporting the conductive case, wherein at least one of the first hinge and the second hinge supports one of the antenna case and the stand.

7. The receiver of claim 6, wherein
at least a part of the first antenna and the second antenna is a part, a packed section, a fixed part on a surface, or a movable part on the surface of the antenna case or the stand.

8. The receiver of claim 1 further comprising a receiving section for receiving terrestrial television broadcasting.

9. The receiver of claim 1 further comprising a receiving section for receiving a radio communication signal.

10. The receiver of claim 1 further comprising a receiving section for receiving an orthogonal frequency division multiplex signal.

11. The receiver of claim 1, wherein the first hinge and the second hinge directly support the first antenna and the second antenna, respectively.

12. The receiver of claim 1, wherein the first hinge and the second hinge indirectly support the first antenna and the second antenna, respectively.

13. The receiver of claim 1, wherein the conductive case is configured as a ground surface.

* * * * *